United States Patent [19]

Toyoda et al.

[11] Patent Number: 4,920,248
[45] Date of Patent: Apr. 24, 1990

[54] ARC SENSING WELDING APPARATUS CONTROLLED BY PROGRAM

[75] Inventors: Kenichi Toyoda, Hino; Toru Mizuno, Tama; Nobutoshi Torii; Yuichi Kanda, both of Hachioji; Shigehiro Morikawa, Atsugi, all of Japan

[73] Assignee: Fanuc, Ltd., Yamanashi, Japan

[21] Appl. No.: 261,966

[22] PCT Filed: Jan. 23, 1988

[86] PCT No.: PCT/JP88/00048

§ 371 Date: Sep. 22, 1988

§ 102(e) Date: Sep. 22, 1988

[87] PCT Pub. No.: WO88/05363

PCT Pub. Date: Jul. 28, 1988

[30] Foreign Application Priority Data

Jan. 23, 1987 [JP] Japan .................................. 62-12579

[51] Int. Cl.$^5$ .............................................. B23K 9/12
[52] U.S. Cl. ............................ 219/124.34; 219/125.12
[58] Field of Search ....................... 219/125.12, 124.34, 219/124.22

[56] References Cited

U.S. PATENT DOCUMENTS 4,477,713 10/1984 Cook et al. ....................... 219/125.12
4,633,059 12/1986 Sarugaku et al. ............... 219/125.12

FOREIGN PATENT DOCUMENTS 61-17591 5/1982 Japan .
59-156577 9/1984 Japan .

*Primary Examiner*—Clifford C. Shaw
*Attorney, Agent, or Firm*—Armstrong, Nikaido, Marmelstein, Kubovcik & Murray

[57] ABSTRACT

An automatic welding apparatus carrying out an arc sensing operation is provided with a memory (2) storing parameters for arc sensing, and these parameters being rewritten by a manual input before beginning the welding, by an input from an on-line computer during the welding, or at a predetermined time by a program which outputs commands to the automatic welding apparatus (FIG. 6).

6 Claims, 11 Drawing Sheets

LIST OF REFERENCE NUMERALS

1 — AUTOMATIC WELDING APPARATUS CARRYING OUT ARC SENSING
2 — MEMORY
3 — ROBOT CONTROLLER
4 — WELDING ROBOT CARRYING OUT ARC SENSING
5 — COMPUTER FOR ARC SENSING PARAMETER INPUT
6 — WELDING WIRE
7 — BASE MATERIAL
8 — SHIELD GAS
9 — ARC
10 — WELDING GROOVE
11 — GAS NOZZLE
12 — TIP

ARC SENSING WELDING APPARATUS CONTROLLED BY PROGRAM

TECHNICAL FIELD

The present invention relates to an automatic welding apparatus, more particularly, to an automatic welding apparatus in which arc sensing is carried out.

BACKGROUND ART

In some automatic welding apparatuses, arc sensing is carried out to manipulate a welding electrode along the welding line determined by a design, deviations from the predetermined path in the up or down directions and right or left directions are detected by variations of the welding current, and the position of the welding electrode is controlled so that deviations are corrected.

An example of the arc sensing as mentioned above is explained hereinafter.

FIG. 1A shows an example of weaving in an automatic welding apparatus, wherein the welding groove 10 is viewed from above. FIG. 1B shows a cross section of the above welding groove 10, and FIG. 1B shows a MIG (metal insert gas) welding case, or a MAG (metal active gas) welding case. In FIG. 1B, reference numeral 11 is a gas nozzle, reference numeral 12 is a tip, and reference numeral 6 is a welding wire (corresponding to the aforementioned welding electrode) reference numeral 7 shows base materials, reference numeral 8 is a flow of a shield gas, and reference numeral 8 is a flow of a shield gas, and reference numeral 9 shows an arc. Arrows pointing to the right and to the left at the center of FIG. 1B, indicate the directions of the weaving.

Assuming that the welding electrode moves from point A to point B, then, as readily understood from FIG. 1B, when the welding electrode (welding wire 6) moves from the right and the left, the distance between the tip and the base material varies.

In MIG welding or MAG welding, welding machines with a constant-voltage characteristic are usually used, wherein the wire extension varies according to the variation of the tip-base material distance, and therefore, the welding current varies, i.e., a characteristic is shown wherein the greater the tip-base material distance, the smaller the welding current, and the smaller the tip-base material distance, the greater the welding current. FIG. 2 shows the variation of the welding current when the welding electrode is moved from left to right, e.g., from the point A to the point B shown in FIG. 1A, in the welding groove having a cross section as shown in FIG. 1B. The welding current is great in the vicinity of point A and point B, whereat the distance between the base material and the tip is small.

Next, with reference to FIGS. 3A, 3B, 3C, and 4, the process of detection and correction of deviation to the right or left of the welding electrode from the predetermined path by data of the welding current distribution for a half cycle of weaving, as shown in FIG. 2, is explained hereinafter. Only the case wherein the cross section of the welding groove is symmetric in the right and left directions (i.e., the welding groove is symmetric with respect to the bisector of the groove angle), is explained here.

First, at step 71 in FIG. 4, the welding corresponding to a half cycle of weaving, for example, from point A to point B, is carried out. Assuming that the welding electrode is at point A at a time $t_1$, and the welding electrode is at point B at a time $t_2$, the distribution of FIG. 2 is as indicated by FIG. 3A, where $t_c$ equals $(t_1+t_2)/2$, i.e., $t_c$ is a half time of the half cycle of the weaving, where the half cycle corresponds to the time duration from $t_1$ to $t_2$, and at the time $t_c$, the welding electrode (wire) is located above the center line of the welding groove. $S_L$ is an integral of the welding current for the duration of the welding of the left half of the welding groove, and $S_R$ is an integral of the welding current for the duration of the welding of the right half of the welding groove.

After the welding of the half cycle of weaving mentioned above is completed at step 72, if all welding processes have not been completed, the minimum value $I_{min}$ of the welding current detected during the half cycle of weaving, is obtained as shown in FIG. 3A. The difference between the welding current shown in FIG. 3A and the minimum value $I_{min}$ (processed welding current data) is integrated for each of the left side and right side respectively, and thus a left side integral $S_L$, and a right side integral $S_R'$ are obtained in step 74.

In step 75, the $S_L'$ and $S_R'$ are compared, and then, a part of the abovementioned processed welding current data which contributes to making one of the $S_L'$ and $S_R'$ larger, corresponding to a predetermined $\alpha\%$ of the time duration from $t_1$ to $t_2$, is ignored, and the remaining time duration $((t_2-t_1)\times(1-\alpha/100))$ is divided into two equal parts. Accordingly, the mean value $t_c'$ is obtained, and then by integrating the abovementioned processed welding current data for each time duration before the time $t_c'$ and after the time $t_c'$, the integrals $S_L''$ and $S_R''$ are obtained, respectively. The abovementioned steps to obtain the integrals $S_L''$ and $S_R''$ will be understood by FIG. 3C, wherein the case where $S_L' > S_R'$ is shown.

In step 76, it is determined whether or not the same side of the integral is still larger, even when the abovementioned data corresponding to the $\alpha\%$ of the time duration is ignored. If the large-small relationship between the left side integral $S_L''$ and the right side integral $S_R''$, which integrals are obtained by ignoring the $\alpha\%$ data as mentioned above, is reversed when compared with the large-small relationship between the left side integral $S_L''$ and the right side integral $S_R'$, it is deemed that there is no considerable deviation to the right or left in the original data, and the next half cycle of welding is begun. This shows that the parameter $\alpha$ is a right or left deviation detecting sensitivity parameter, which determines the sensitivity of a detection of deviation of the welding electrode from the predetermined path.

In the above determination, if the large-small relationship between $S_L''$ and $S_R''$ is not reversed when compared with $S_L'$ and $S_R'$, it is deemed that the deviation of the welding electrode from the predetermined path to the right or left is detected, and then, in step 77, the amount of correction of the position of the welding electrode is calculated in accordance with the deviation. In the equation of step 77, $\Delta_1$ is a right or left, and in order to improve the sensitivity when the deviation is small, the root of $|S_R''/S_L''-1|$ is obtained. Alternatively, other functions which have similar characteristics to the above can be used.

The amount of correction to the right or left $\Delta H$ is thus obtained, and then, in step 78, a position correction command is output to the welding electrode. This correction is realized when driving the welding electrode [actually, driving the torch (not shown) which holds the welding electrode (wire)] for the next half cycle of weaving (step 71).

The above explanation is of the procedure used to detect a deviation to the right or left when the cross-sectional shape of the welding groove is symmetrical in the right and left directions, i.e., the welding is also carried out symmetrically with respect to the center line of the welding groove. But, when the cross-sectional shape of the welding groove, or another welding condition, is asymmetric with respect to the center line of the welding groove, the aforementioned $S_R$ and $S_L$ become asymmetric according to the aforementioned asymmetry. Assuming that, in the above case, $S_L < S_R$ when the welding electrode has passed the predetermined path, then, if an appropriate parameter p, and $S_L$ and $\overline{S}R = S_R \times p/100$ are used instead of the $S_L$ and $S_R$ used when the welding condition is symmetric with respect to the center line of the welding groove, the detection of deviation to the right or left can be carried out in the same manner as when the welding condition is symmetric. This means that p is an offset parameter for carrying out arc sensing during a welding when the welding condition is asymmetric to the right and left (i.e. asymmetric with respect to the center line of the weld groove), and this parameter should be determined in advance by experiment or the like.

Next, with reference to FIG. 5, a process of detecting and correcting deviation of the welding electrode from the predetermined path in the up or down direction, is explained.

In step 81 of FIG. 5, an integral of the welding current for a half cycle of weaving is obtained and this integral then used as a standard value $S_O$. After the half cycle is completed in step 82, integrals $S_i$ (i=1, 2, ...) of the welding current for the following and repeated half cycles of weaving (step 84) are successively obtained, each of the integrals $S_i$ is compared with the standard value $S_0$, and it is determined whether the deviation is beyond $\beta\%$ (step 87). If the deviation is not more than $\beta\%$, then the next half cycle of welding is carried out (step 74), but, if the deviation is more than $\beta\%$, the amount of correction of the position of the welding electrode is calculated according to the amount of the deviation found in step 88. The parameter $\beta$ is an up or down deviation detecting sensitivity parameter which determines the sensitivity of the detection of deviation of the welding electrode from the predetermined path, and $\Delta_2$ in step 88 is an up or down correction amount parameter which determines a degree of the amount of correction in the up or down direction.

To improve the sensitivity when the deviation is small, the root of $|S_i/S_0 - 1|$ is obtained, similar to step 77 in FIG. 4. Alternatively, other functions which have similar characteristics to the above can be used. Thus the command for the up or down correction amount $\Delta_v$ is output in step 88, and this correction is realized when driving the welding electrode for the next half cycle of weaving (step 84).

The above explanation is of the procedure for detecting deviation in the up or down direction.

Further, at the beginning of the welding with arc sensing as mentioned above, it should be noted that arc is not stable just after the arc is first generated, and therefore, at the beginning of welding, arc sensing is carried out in accordance with the following procedure.

①the welding electrode is held in the dwell condition from the time $T_O$ (the time of the beginning of arc generation) to the determined time $T_1$, until the arc becomes stable:

②detection and correction of a deviation to the right or left is begun at the determined time $T_2$:

③detection and correction of a deviation in the up or down direction is begun at the determined time $T_3$: where $T_0 < T_1 < T_2 < T_3$.

As mentioned before, because, the operation of detecting a deviation to the right or left consists of a relative comparison between the right side integral with respect to the center line of the welding groove and the left side integral in that half cycle of weaving, it takes less time to obtain the stability necessary for detecting the deviation to the right or left. Nevertheless, the detection of a deviation in the up or down direction cannot be started until the arc is sufficiently stable after the initial deviation of the arc has been first corrected by the operation correcting the deviation to the right or left, because the detection of deviation in the up or down direction begins with an operation for obtaining an absolute value which is equal an integral of the welding current for a half cycle of weaving, as a standard value $S_0$.

In the above description, $T_1$, $T_2$, and $T_3$ are parameters which must be set in advance, by experiment or the like. The same is true in the case of $\alpha$, $\beta$, $\Delta_1$, $\Delta_2$, and p.

In the aforementioned automatic welding apparatus in which the arc sensing is carried out, the parameters which should be set in advance before the beginning of welding must be varied in accordance with the variations of welding conditions, because these parameters are determined by the welding conditions. During the welding, if the set parameters are judged inappropriate, the parameters must be changed even during welding.

DISCLOSURE OF THE INVENTION

An object of the present invention is to provide an automatic welding apparatus having parameters which have been set, which parameters can be changed even during welding, when necessary.

An automatic welding apparatus according to the present invention carries out an arc sensing operation, which is a control operation comprising: detecting deviations of a welding electrode from a predetermined path in the up or down direction and right or left direction, by variations of the welding current while welding with a weaving operation, and correcting the deviation; having a memory which stores parameters for arc sensing, which parameters are rewritten by a manual input before beginning the welding, by an input from an on-line computer during welding, or at a predetermined time, by a program which outputs commands to the automatic welding apparatus.

BEST MODE FOR CARRYING OUT THE INVENTION

Figure 6:
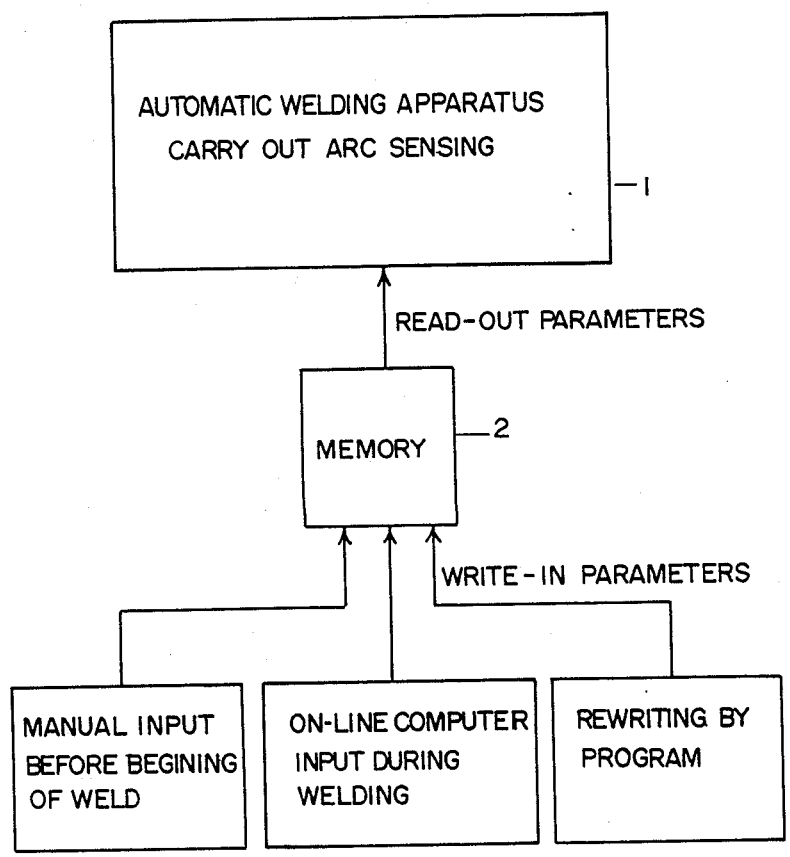
FIG. 6 shows the basic construction of an automatic welding apparatus according to the present invention.

FIG. 6 shows a basic construction of the automatic welding apparatus according to the present invention. The automatic welding apparatus according to the present invention is provided with a memory 2 wherein the content thereof can be read out an any time in accordance with a program thereof, and can be rewritten from the outside or can be rewritten in accordance with the program thereof.

Therefore, in the automatic welding apparatus according to the present invention, weld parameters can be set by a manual input before beginning the welding, and where the welding consists of a plurality of welding phases each having a different welding condition, weld parameters can be set in advance by a program which outputs commands to the automatic welding apparatus, so that at the point at which the welding condition varies, the weld parameters are rewritten according to the variation of the welding condition. Further, when an operator wishes to change the parameters during welding, the weld parameters can be rewritten by an input from an on-line computer.

Figure 7:
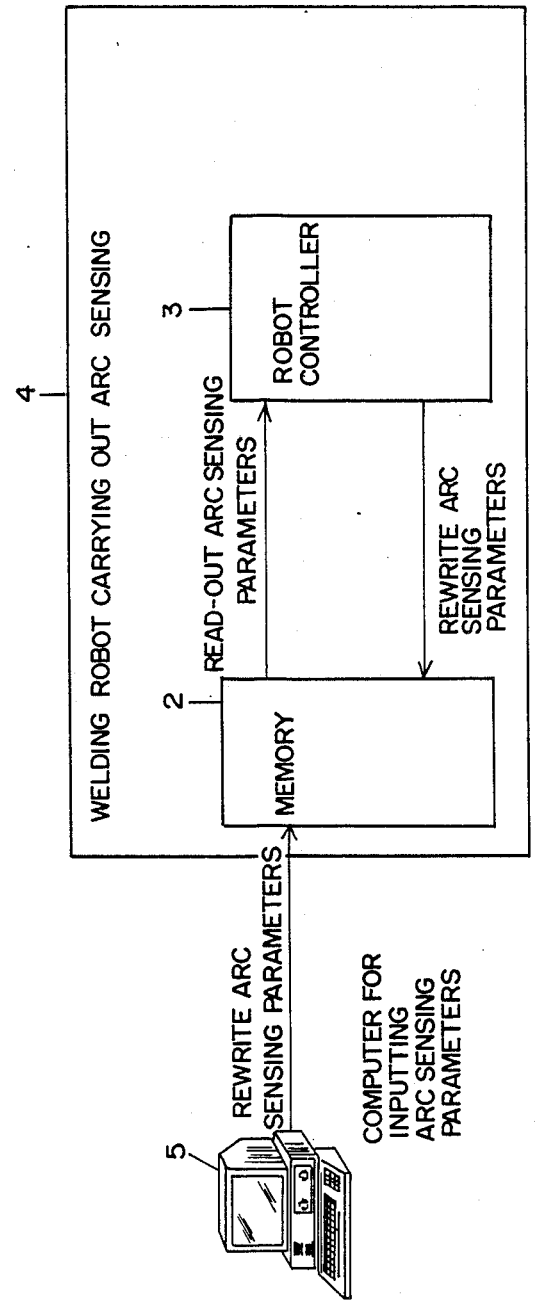
FIG. 7 shows the construction of an embodiment of the present invention.

FIG. 7 shows a welding robot 4 as an embodiment of the present invention. The welding robot 4 is provided with a memory 2 which stores parameters for arc sensing (hereinafter called "arc sensing parameter", or simply "parameter") and a computer 5 for inputting the arc sensing parameters, and the welding robot 4 carries out an arc sensing operation.

The term "arc sensing parameter" covers the aforementioned right or left deviation detecting sensitivity parameter $\alpha$, the up or down deviation detecting sensitivity parameter $\beta$, the right or left correction amount parameter $\Delta_1$, the up or down correction amount parameter $\Delta_2$, the offset parameter p, and the parameters which determine the timings at the beginning of the arc sensing operation $T_1$, $T_2$, and $T_3$, and the like. The term "arc sensing parameter" further covers parameters which determine the operation of weaving, including a cycle time of weaving, an amplitude of the weaving, a waiting time at each of the right and left turing points where the welding electrode is farthest from the center line of the welding groove, and the like. The parameters which determine the operation of the weaving are also stored in the memory 2 in FIG. 7, and rewritten and read out in the same manner as the other parameters.

All operations of the welding robot shown in FIG. 7, which carries out arc sensing, including the arc sensing operations, are controlled by a robot controller 3 comprising a microcomputer. All functions such as those possessed by usual welding robots, including a means for detecting welding current, a means for driving a welding electrode (wire) (i.e., a means for driving a torch (not shown) holding the welding electrode (wire) ), are equipped in the welding robot 4, which carries out arc sensing welding, shown in FIG. 7, although not shown therein.

Reference numeral 5 in FIG. 7 denotes a computer for inputting the arc sensing parameters. The arc sensing parameters are manually input from a key board of the computer before the beginning of the welding, or input by the computer as an on-line computer during the welding operation.

Figures 8, 8A:
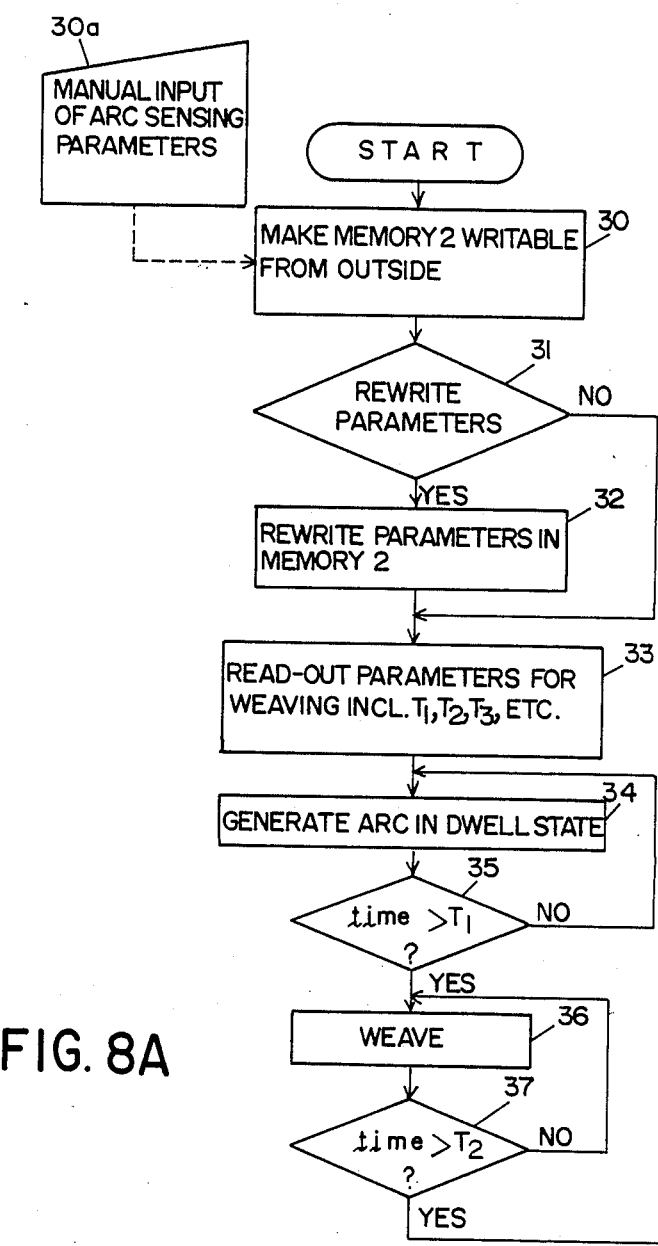
FIGS. 8, 8A, 8B, 8C, and 8D show an example of a controlling process in the robot controller 3 in FIG. 7.
Figure 8B:
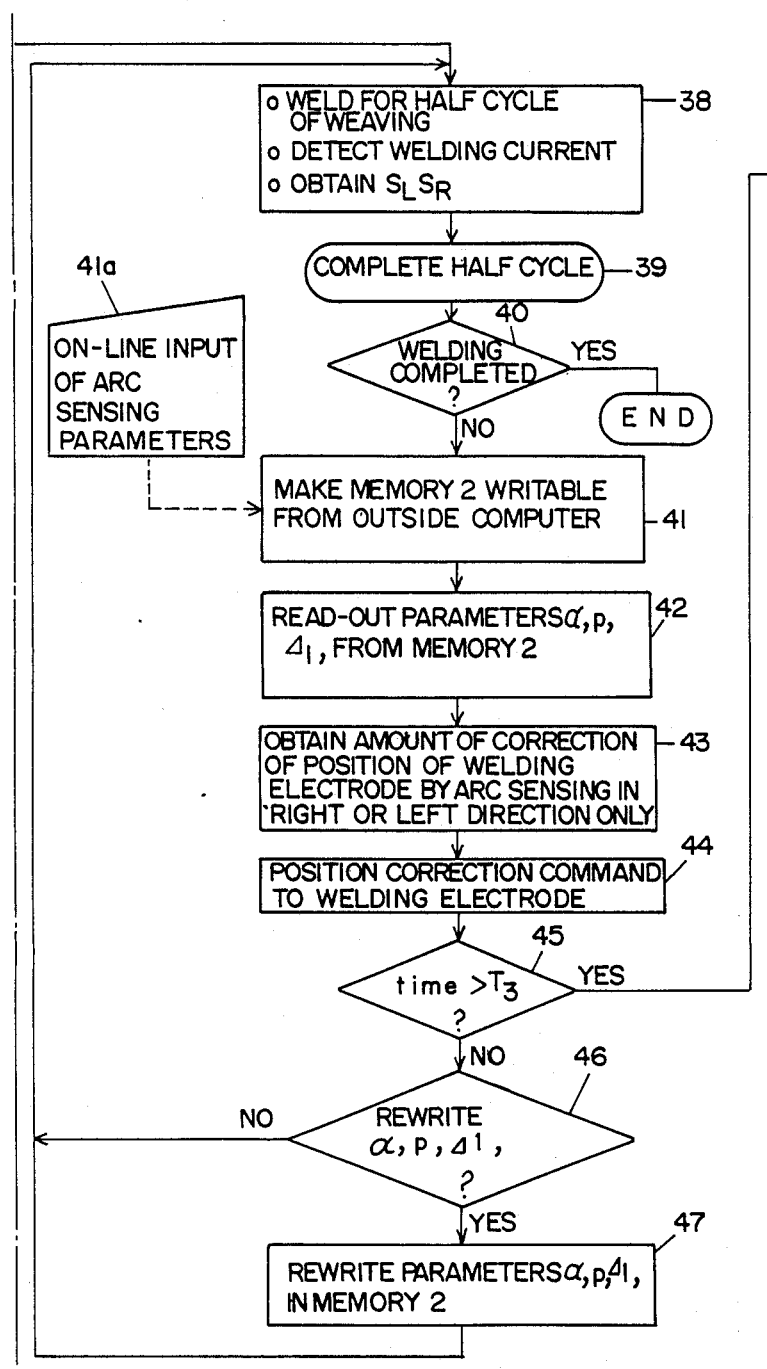
Figure 8C:
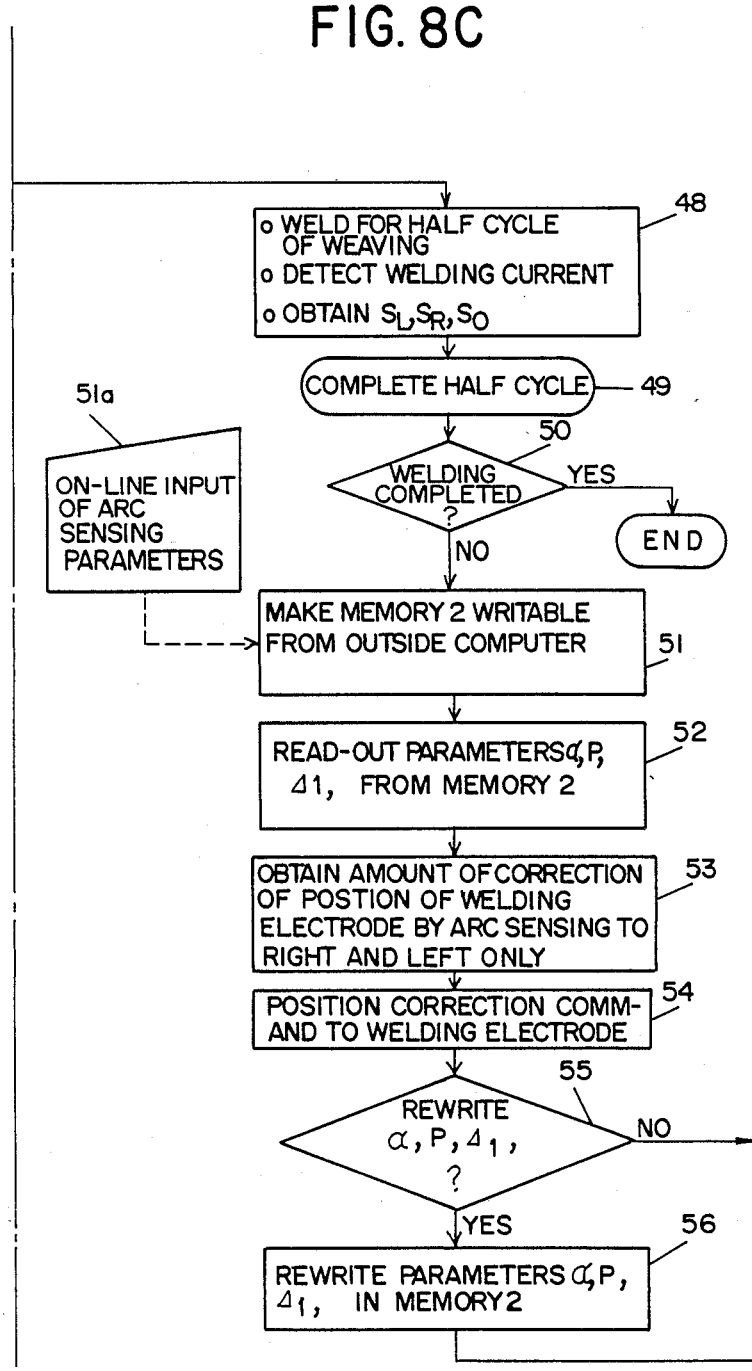
Figure 8D:
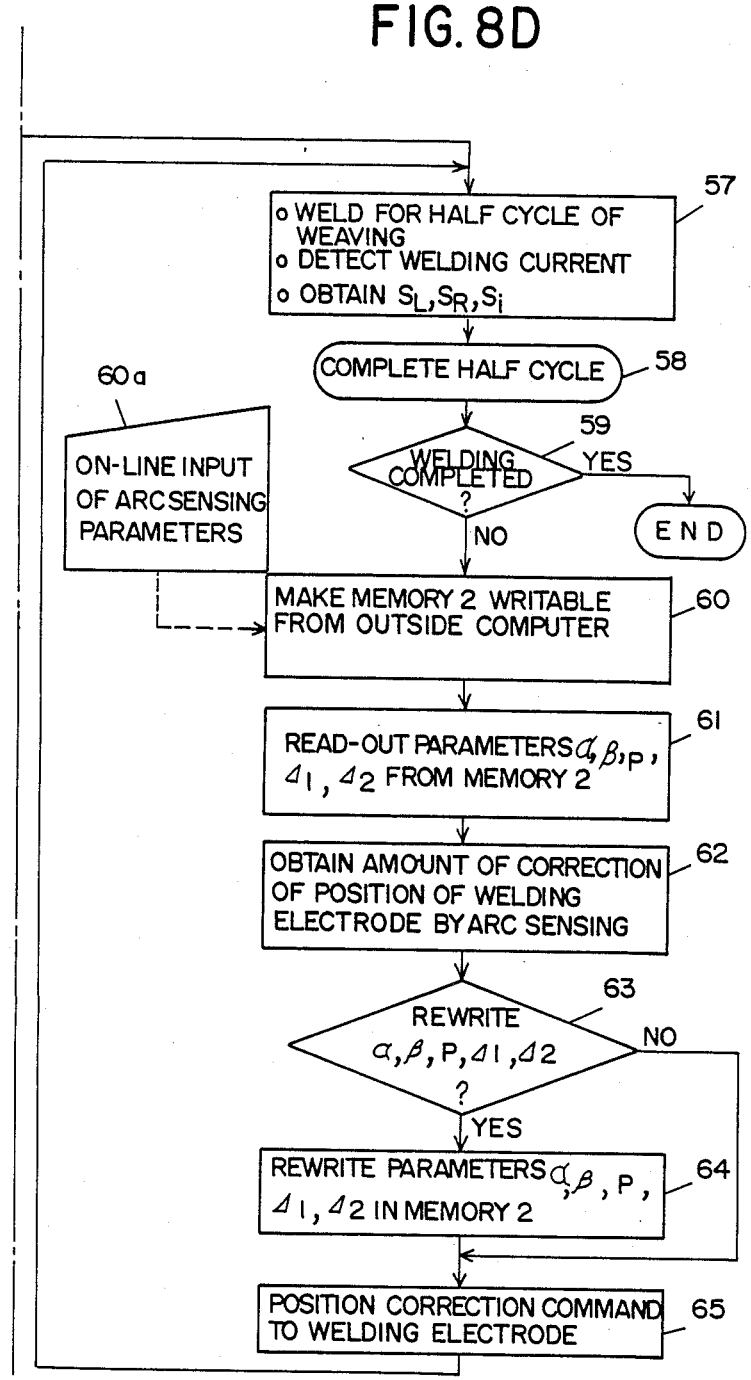

The robot controller 3 drives and controls the welding robot in accordance with a program input thereto in advance. Among the operations of the robot controller 3, the operations relating to the arc sensing are shown in FIG. 8.

First, before beginning the welding, the arc sensing parameters can be written into the memory 2 in step 30, in response to the aforementioned manual input operation from the computer 5 of FIG. 7 for inputting the arc sensing parameters (step 30a). Step 32 is a step for writing the arc sensing parameters determined by the program into the memory 2 (rewriting by program), and it is determined at step 31 whether or not the operation of the step 32 should be conducted.

At the beginning of the welding, the parameters relating to the weaving must be read out, for example, the dwell time $T_1$ after arc generation, the time $T_2$ at which the arc sensing operation to the right and left is begun, the time $T_3$ at which the arc sensing operation in the up and down direction is begun, the cycle time or amplitude of weaving, the waiting time at each of the right and left turning points in the weaving path, and the like. This operation is carried out in step 33.

First, at time $T_0$, an arc is generated in the dwell state (step 34), and this state is held until the time $T_1$, to ensure that the arc is stable.

When the time $T_1$ is confirmed in step 35, the weaving operation defined by the parameters read out in step 33 is carried out in step 36, and is continued until the time $T_2$.

Figure 1A:
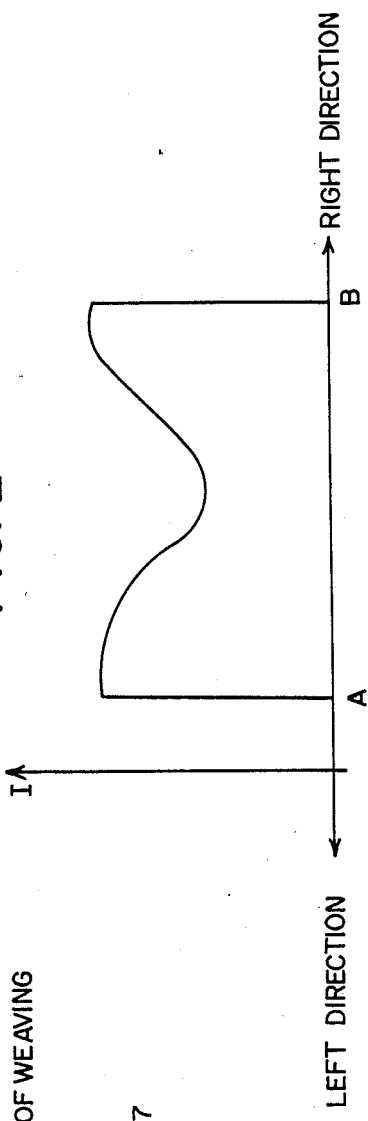
FIG. 1A shows an example of a weaving operation in an automatic welding apparatus.
Figure 1B:
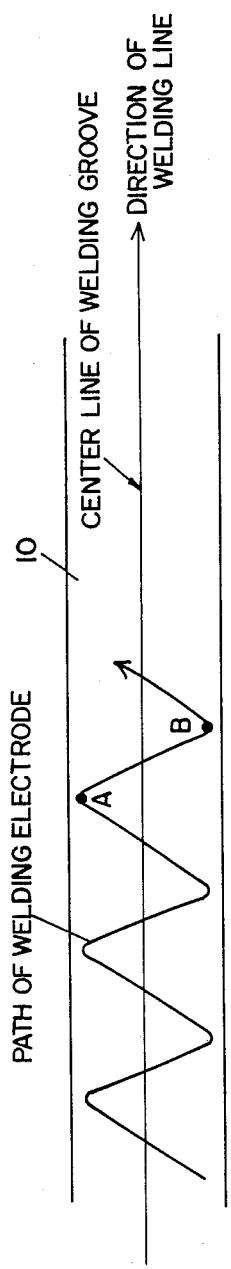
FIG. 1B shows a cross section of a welding groove 10.
Figure 2:
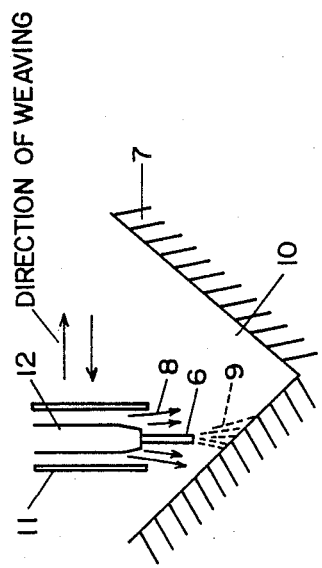
FIG. 2 shows a variation of a welding current during a half cycle time of weaving.
Figure 3A:
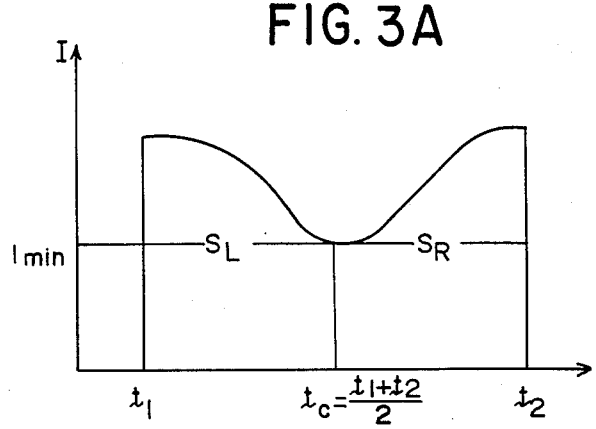
FIGS. 3A, 3B and 3C show a process of detecting a deviation to the right or left.
Figure 3B:
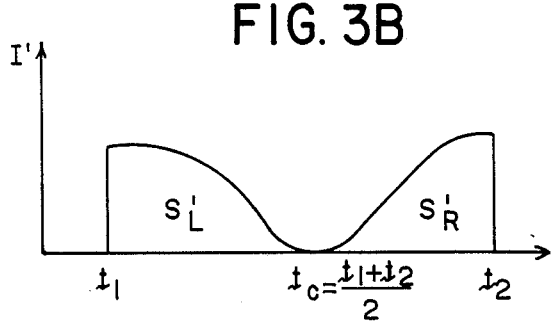
Figure 3C:
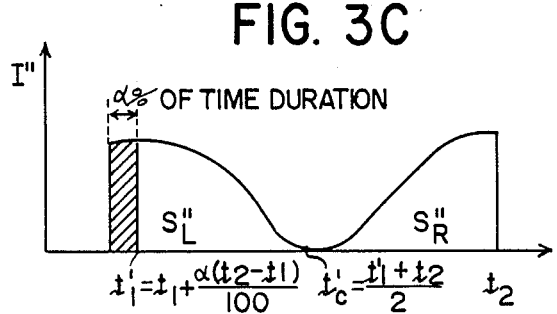
Figure 4:
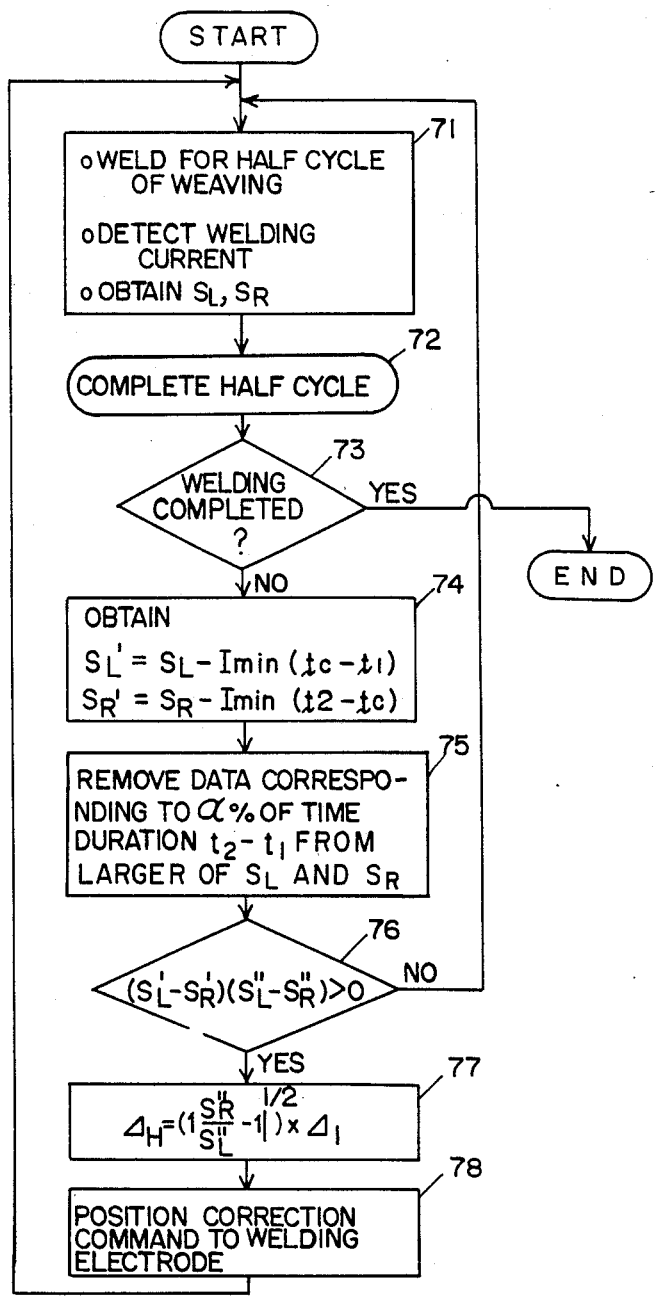
FIG. 4 shows a process of detecting and correcting a deviation to the right or left.

When the time $T_2$ is confirmed in step 37, the operation of detecting a deviation to the right or left, begins at step 38. The parameters necessary to detect the deviation to the right or left, and to calculate the amount of correction, are read from the memory 2 in step 42. The calculation of the amount of correction of the position of the welding electrode by arc sensing in the right and left direction only is made in step 43, and the corresponding correction command is output in step 44. This correction is realized when driving the welding electrode (the aforementioned torch) during the next half cycle of weaving (step 38 or 48). A more detailed operation in step 43 is equal to the aforementioned operation in steps 74 to 77 in FIG. 4. The above arc sensing operation to the right and left only is continued until the time $T_3$.

Before the beginning of the next half cycle of the welding (step 38), it is determined at step 46 whether or not the arc sensing parameters for an arc sensing operation to the right and left only should be rewritten. If the result is positive, rewriting is carried out (step 47, rewriting by program).

When the time $T_3$ is confirmed in step 45, in step 48, during the welding for the half cycle of weaving, the aforementioned $S_0$, which is used as a standard value for detecting deviation in the up or down direction, is obtained, as well as the $S_L$ and $S_R$.

The steps 49 to 56 are the same as the steps 39 to 44, 46, and 47 mentioned before.

The steps 57 to 65 show the operations where detection and correction of deviation in both the right and left direction and up and down direction are carried out at the same time. $S_L$, $S_R$ and $S_i$ (i=1, 2, ...) are obtained during the welding for each half cycle of the weaving (step 57).

In step 60, the parameters $\alpha$, $\beta$, p, $\Delta_1$, $\Delta_2$ for arc sensing in both the right and left direction and the up and down direction are read out from the memory 2, and in step 62, a detection of deviation in both the right and left direction and the up and down direction, and a calculation for correction thereof, are carried out, whereby, the amount of correction is obtained, and the corresponding correction command is output in step 63.

Figure 5:
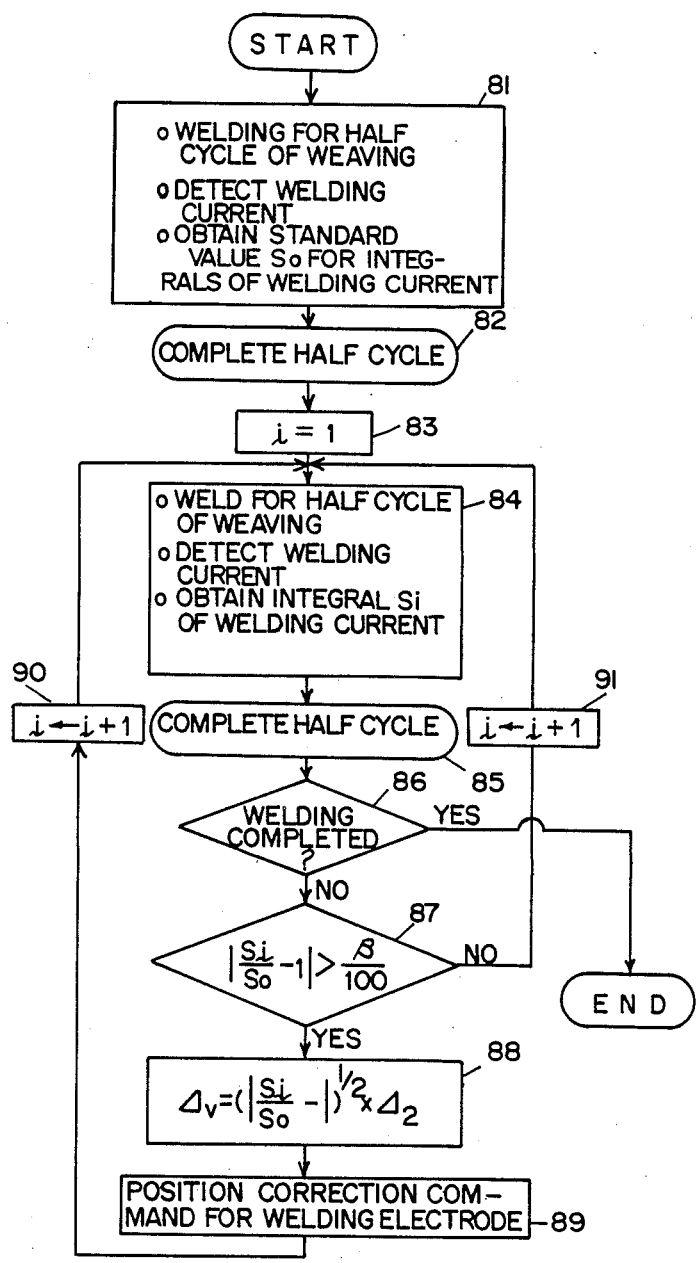
FIG. 5 shows a process of detecting and correcting a deviation in the up or down direction.

This correction is realized during the next half cycle of weaving (step 57). A more detailed operation in step 62 corresponds to the operations of steps 74 to 77 in FIG. 4 and steps 87 and 88 in FIG. 5.

In steps 64 and 65, before the beginning of the next half cycle of the welding, it is determined whether or not the arc sensing parameters for arc sensing operations in both the right and left direction and up and down direction should be rewritten, and if necessary, the rewriting is carried out (rewriting by program).

The memory 2 is controlled to be writable not only before the beginning of the welding (steps 30 and 30a) but also for a predetermined duration for each half cycle of the weaving (steps 41, 51, 60), so that the arc sensing parameters in the memory 2 can be rewritten from the computer 5 in FIG. 7 for inputting the arc sensing parameters even during the welding operation (steps 41a, 51a, 60a).

In steps 40, 50, 59, it is determined whether or not the weld required by the design is completed by the welding performed during each half cycle of weaving. If the weld is completed, all of the above processes are ended.

Described above is an example of processes by the robot controller 3 in FIG. 7.

As mentioned above, in the automatic welding apparatus according to the present invention, the parameters for arc sensing can be set or changed to the optimum value at any time, not only before the beginning of the welding, but also during the welding, by an input from an on-line computer, or by a program which outputs commands for the operation of the automatic welding apparatus.

INDUSTRIAL APPLICABILITY

The present invention is, in particular, useful in automatic welding with weaving, where the welding process includes a plurality of phases in each having a different welding condition.

While the invention has been particularly shown and described in reference to preferred embodiments thereof, it will be understood by those skilled in the art that changes in form and details may be made therein without departing from the spirit and scope of the invention.

We claim:

1. An automatic welding apparatus for carrying out an arc sensing control operation in accordance with an operating program which is incorporated therein, comprising:
   a deviation detecting means for detecting deviations of a welding electrode from a predetermined path in an up or down direction and right or left direction by detecting variations in a welding current while welding in a weaving manner;
   a deviation correcting means for correcting said deviations;
   a memory means for storing parameters for arc sensing; and
   a memory automatic rewriting means for automatically rewriting parameters in said memory means at a predetermined time in accordance with said operating program.

2. An automatic welding apparatus according to claim 1, further comprising a parameter reading means for reading said parameters for welding of a half cycle of weaving, stored in said memory means, before a welding for each half cycle of weaving.

3. An automatic welding apparatus according to claim 1 or 2, wherein said memory automatic rewriting means rewrites said memory means before a welding for each half cycle of weaving.

4. An automatic welding apparatus for carrying out an arc sensing control operation in accordance with an operation program incorporated therein, comprising:
   a deviation detecting means for detecting deviations of a welding electrode from a predetermined path in an up or down direction and right or left direction by detecting variations in a welding current while welding in a weaving manner;
   a deviation correcting means for correcting said deviations;
   a memory means for storing parameters for arc sensing;
   a manual rewriting means for rewriting parameters in said memory means by manually inputting said parameters before a beginning of welding;
   an on-line-input-memory rewriting means for rewriting parameters in said memory means according to an input from an on-line computer during welding; and
   a memory automatic rewriting means for automatically rewriting parameters in said memory means at a predetermined time in accordance with said operating program.

5. An automatic welding apparatus according to claim 4, further comprising a parameter reading means for reading said parameters for a welding of a half cycle of weaving, stored in said memory means, before a welding for each half cycle of weaving.

6. An automatic welding apparatus according to claim 4 or 5, wherein said memory automatic rewriting means rewrites said memory means before a welding for each half cycle of weaving.

* * * * *